(12) United States Patent
Snyder et al.

(10) Patent No.: US 10,143,183 B2
(45) Date of Patent: Dec. 4, 2018

(54) ANIMAL TOENAIL GRIPS

(71) Applicant: Dr. Buzby's Innovations, LLC, Beaufort, SC (US)

(72) Inventors: Julie B. Snyder, Beaufort, SC (US); Todd G. Lynd, St. Helena, SC (US)

(73) Assignee: DR. BUZBY'S INNOVATIONS, LLC, Beaufort, SC (US)

( * ) Notice: Subject to any disclaimer, the term of this patent is extended or adjusted under 35 U.S.C. 154(b) by 736 days.

(21) Appl. No.: 13/831,387

(22) Filed: Mar. 14, 2013

(65) Prior Publication Data

US 2013/0256162 A1     Oct. 3, 2013

Related U.S. Application Data

(60) Provisional application No. 61/617,399, filed on Mar. 29, 2012.

(51) Int. Cl.
    *A01K 13/00*     (2006.01)
    *A01K 29/00*     (2006.01)

(52) U.S. Cl.
    CPC ............ *A01K 13/007* (2013.01); *A01K 13/00* (2013.01); *A01K 29/00* (2013.01)

(58) Field of Classification Search
    CPC ....................................................... A01K 13/00
    USPC ....... 119/856, 851, 850, 600, 607, 716, 814, 119/816
    See application file for complete search history.

(56) References Cited

U.S. PATENT DOCUMENTS 2,028,674 A * 1/1936 Larson ........................... 119/851
2,389,237 A * 11/1945 Petrullo ........................... 294/25
4,644,941 A 2/1987 Ogle, II
4,962,731 A 10/1990 Wexler
5,085,234 A 2/1992 Silverman
5,095,897 A 3/1992 Clark et al.
D329,928 S 9/1992 Wexler
5,688,181 A 11/1997 Albert
5,906,546 A 5/1999 Albert
6,058,891 A * 5/2000 Simonson et al. ............ 119/851
6,557,853 B2 5/2003 Huettlinger
6,786,029 B2 9/2004 Kuzuu
6,863,033 B1 3/2005 Fleming
7,069,879 B1 7/2006 Wexler (Continued)

FOREIGN PATENT DOCUMENTS

JP     2003-153638 A     5/2003
JP     2003-158935 A     6/2003

OTHER PUBLICATIONS

International Search Report and Written Opinion dated Jun. 28, 2013 for PCT/US2013/031797, pp. 1-10.

(Continued)

*Primary Examiner* — Magdalena Topolski

(74) *Attorney, Agent, or Firm* — Nixon & Vanderhye P.C.

(57) ABSTRACT

An animal toenail grip designed and configured to provide an animal with traction on slippery and/or hard surfaces. The toenail grip includes a tubular member removably securable via frictional interference to the nail of the animal. The tubular member is constructed of a flexible, returnably-resilient material having superior non-slip or gripping characteristics. The toenail grip enhances proprioception in animals having certain neurological deficits and yields long term improvement in gait and stance on hard-surface flooring.

7 Claims, 1 Drawing Sheet

(56) References Cited

U.S. PATENT DOCUMENTS

| | | | |
|---|---|---|---|
| D560,317 S | | 1/2008 | Townshend |
| D564,713 S | | 3/2008 | Wexler |
| 7,703,419 B1 | * | 4/2010 | Wexler .................. A01K 13/00 119/851 |
| 2003/0145805 A1 | * | 8/2003 | Gat .............................. 119/851 |
| 2003/0164145 A1 | * | 9/2003 | St. John ....................... 119/850 |
| 2003/0217702 A1 | * | 11/2003 | Kuzuu .......................... 119/851 |
| 2006/0118129 A1 | | 6/2006 | Allen et al. |
| 2006/0248993 A1 | | 11/2006 | Crutchfield |
| 2007/0039565 A1 | * | 2/2007 | Krottinger ................... 119/850 |
| 2007/0089691 A1 | | 4/2007 | Hendy |
| 2009/0229538 A1 | | 9/2009 | Friedland |

OTHER PUBLICATIONS

Office Action dated Feb. 4, 2014 for co-pending U.S. Appl. No. 14/139,115, pp. 1-9.

\* cited by examiner

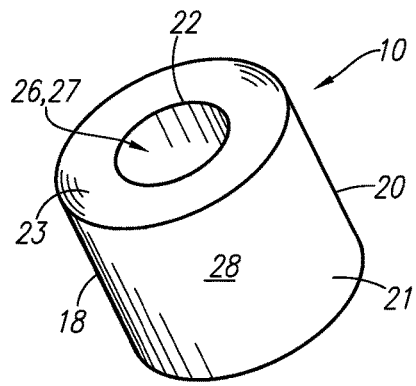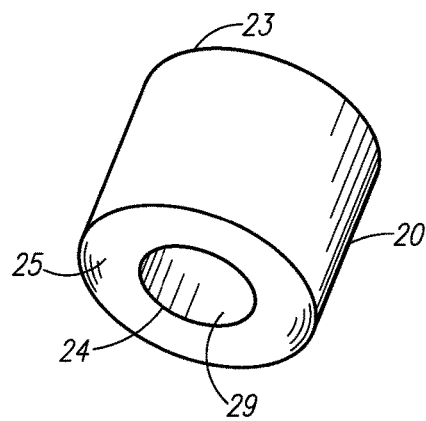
FIG. 1     FIG. 2
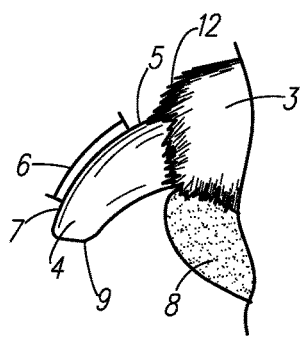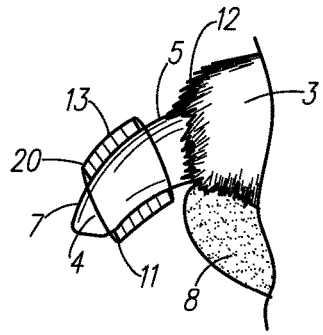
FIG. 3     FIG. 4
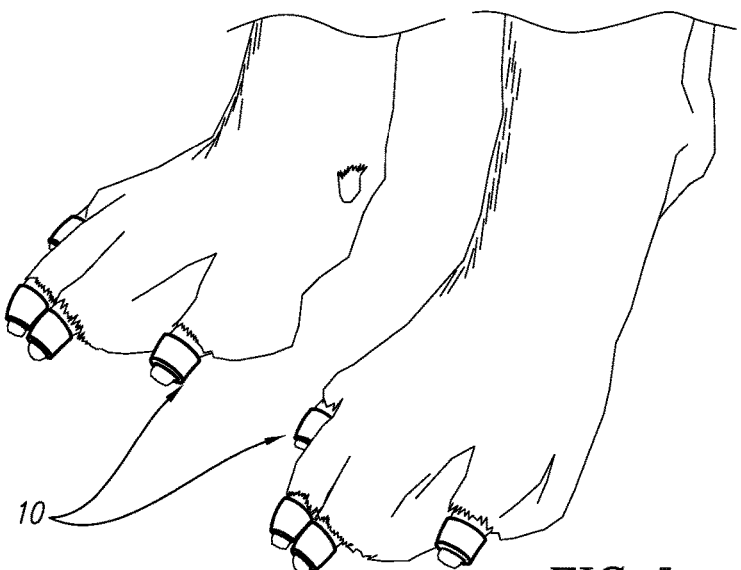
FIG. 5

ANIMAL TOENAIL GRIPS

RELATED APPLICATIONS

This application claims priority to U.S. Provisional Patent Application No. 61/617,399, filed Mar. 29, 2012 and entitled "Canine Toenail Grips." The entire contents of the above-identified priority application are hereby fully incorporated herein by reference.

FIELD OF THE INVENTION

The present invention relates generally to animal accessories, and more particularly, to animal toenail grips for purposes of providing fraction on hard-surface flooring.

BACKGROUND OF THE INVENTION

By design, dogs, and other animals with toes, engage their toenails to gain traction. When slipping or sliding, dogs will flex their paws and engage their toenails to prevent falling. This design is perfect for acquiring traction on earthen terrain. However, on hard-surface flooring, the engagement of the toenails results in more slippage and causes the animal to lose stability, potentially leading to slip-and-fall injuries.

Currently there exist in the art various toenail covers, paw covers, and paw pad adhesives for animals. However, the prior art has failed to disclose or teach a tubular member removably securable about the tip and long mid-portion of an animal's toenail, the tubular member constructed of a flexible, returnably-resilient material having superior non-slip or gripping characteristics as taught by the present application.

Accordingly, a need exists for an animal toenail grip removably attachable about the caudodistal edge of the nail tip and the long mid-portion of an animal's toenail, wherein such grip provides an animal with traction on slippery and/or hard surfaces. The present invention provides a vehicle to increase the coefficient of friction between the nail tip and the surface of the floor. Therefore, the development of the animal nail grip of the present invention fulfills the aforementioned need.

A search of the prior art did not disclose any patents that read directly on the claims of the instant invention; however, the following references were considered related: U.S. Pat. No. 6,786,029 B2 issued in the name of Kuzur; U.S. Pat. No. D329,928 issued in the name of Wexler; U.S. Patent Application No. 2009/0229538 A1 published in the name of Friedland; U.S. Pat. No. 4,962,731 issued in the name of Wexler; U.S. Pat. No. D564,713 issued in the name of Wexler; U.S. Pat. No. D560,317 issued in the name of Townsend; U.S. Pat. No. 7,703,419 B1 issued in the name of Wexler; U.S. Pat. No. 7,069,879 B1 issued in the name of Wexler; U.S. Pat. No. 6,863,033 B1 issued in the name of Fleming; and U.S. Patent Application No. 2007/0089691 A1 published in the name of Hendy.

Consequently, a need has been felt for an animal nail grip having superior gripping characteristics. This application presents claims and embodiments that fulfill a need or needs not yet satisfied by the products, inventions and methods previously or presently available. In particular, the claims and embodiments disclosed herein describe an animal nail grip comprising: an annulus comprising an elongated, tubular member; the tubular member comprising an elongated body having an open upper end, an open lower end, and a hollow interior defined as a nail receiving cavity; the body further comprising an external circumferential surface and an inner circumferential surface; the inner circumferential surface being a circular boundary defining the nail receiving cavity; the nail receiving cavity defines a diameter measuring less than the smallest diametric measure of the external circumferential grip seating position of the nails of an animal; the open upper end of the body of tubular member is in open, direct, fluid communication with the open lower end thereof; the tubular member is constructed of a flexible, returnably-resilient material having superior non-slip or gripping characteristics, and wherein the tubular member being removably held to the nail of an animal via mechanical interference; the animal nail grip providing unanticipated and nonobvious combination of features distinguished from the products, inventions and methods preexisting in the art.

For many animals with neurologic and/or musculoskeletal abnormalities, fear becomes a life-altering factor. This fear is heightened on hard-surface flooring. Animals with neurologic and/or musculoskeletal abnormalities tend to lack confident mobility and typically choose to avoid hard-surface floors, or unnaturally compensate on them, resulting in altered gait and/or behavioral problems. The present invention improves the stability of animals while standing and moving, and diminishes the emotional stress animals experience from lack of traction on hard-surface flooring and other slick or slippery surfaces.

Animals affected with certain neurologic and/or musculoskeletal conditions tend to compensate for their disabilities by altering their gait, posture and/or stance. Proprioception is the ability to sense the relative position and location and orientation and movement of the body and its parts, in relation to each other and the environment. Proprioception is based on a multi-component sensory system. Proprioceptive deficits in animals cause abnormal body movements or positions due to lack of normal perception. Loss of proprioception can cause abnormal placement reactions in the limbs, abnormal limb position at rest, such as legs crossed or paws turned under, and abnormal wearing of the toenails. Loss of proprioception is a nonspecific indication of neurologic disease. General causes of proprioceptive deficits include, but are not limited to, cerebral diseases, cerebellar diseases, disorders of the thalamus, disorders of the brain stem, disorders of the spinal cord, and disorders of the peripheral nerves. Abnormal limb posture at rest, such as limbs crossed over or turned under, abnormal wearing of the toenails, partial loss of movement of the limbs or a limb, paralysis, incoordination, and ataxia are all conditions that may indicate proprioceptive deficits.

Accordingly, a need exists for a method to provide proprioceptive stimuli in animals. The development of the animal toenail grip of the present invention fulfills this need.

Applicants are unaware of any product, method, device or reference that discloses the features of the claims and embodiments disclosed herein.

SUMMARY OF THE INVENTION

In certain example embodiments described herein, an animal toenail grip is disclosed. The nail grip is designed and configured to provide an animal with traction on slippery and/or hard surfaces, such as hard-surface flooring. The nail grip of the present invention comprises an annulus, the annulus comprising an elongated, tubular member comprising an elongated body having an open upper end, an open lower end, and a hollow member.

The tubular member is constructed of a flexible, returnably-resilient material, the construction material preferably being non-toxic, water-impermeable elastomers.

The tubular member is slid onto and annularly encompasses the nail of the animal, the tubular member being removably held to the nail via mechanical interference. More specifically, the tubular member is slid onto the nail of the animal in conjunction with a lubricant to aid in movement of the tubular member across the nail of the animal by reducing the coefficient of friction. Although not required, the tubular member may be removably held to the nail of the animal via a lubricant/adhesive. For practical purposes, a number of tubular members may be removably secured to a corresponding number of selected nails. Once installed, as the animal walks or runs, the edge of the tubular member intimately engages the walking/running surface and grips such surface thereby providing the animal with traction.

An object of the present invention is to provide fraction for an animal by helping the animal, who can not gain purchase on hard-surface flooring without its legs splaying, rise from a lying position, or walk, without slipping on a hard or slippery surface.

Another object of the present invention is to improve the stability of animals while standing on and/or moving across hard-surface flooring.

A further object of the present invention is to improve the stance and gait of animals with certain conditions such as ataxia and/or mild proprioceptive deficits when standing on and/or moving across hard-surface flooring, or other slick or slippery surfaces.

Yet another object of the present invention is to improve or enhance proprioception in an animal with certain neurological deficits. The animal toenail grips of the present invention have shown unexpected results in providing proprioceptive stimulus, yielding long-term improvement in the stance and gait of an animal on hard-surface flooring.

Another object of the present invention is to enhance muscle tone of animals affected by neurologic and/or musculoskeletal conditions by increasing mobility and activity of the animal.

A further object of the present invention is to reduce the likelihood of slip-and-fall injury to the animal.

Another object of the present invention is to reduce or eliminate the emotional stress an animal experiences from lack of traction on hard-surface flooring, thereby increasing the animal's confidence and attitude, while reducing fear-related behaviors.

The toenail grips of the present invention may be used post-operatively following surgery, especially orthopedic, to aid in rehabilitation and prevention of re-injury due to slip-and-fall accidents.

Yet another object of the present invention is to improve an animal's quality of life by providing confidence, stability, mobility and increased activity level.

A further object of the present invention is to improve the biomechanical function, posture and gait of an animal by reducing abnormal forces on joints caused by compensation and lameness.

The toenail grips of the invention can be used on multiple species of animals having toenails anatomically adapted for the product, including, but not limited to, animals with non-retractable claws, disabled or rehabilitating species with retractable claws, and birds.

The animal nail grip is envisioned to be commercially available in a variety of colors and/or patterns.

The animal nail grip is commercially available as a kit.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 1 is a top perspective view of an animal nail grip, in accordance with one or more embodiments presented herein.

FIG. 2 is a bottom perspective view of the animal nail grip of FIG. 1;

FIG. 3 is a partial side elevational view of an animal's paw illustrating one toe and toenail thereof;

FIG. 4 is a partial cross-sectional view of the animal nail grip shown removably attached to the caudodistal tip of the nail of an animal, in accordance with one or more embodiments presented herein; and FIG. 5 is a partial perspective view illustrating animal nail grips removably attached to respective nails of a canine's pair of paws, in accordance with one or more embodiments presented herein.

DETAILED DESCRIPTION OF EXAMPLE EMBODIMENTS

The present invention relates to a device placed on the toenails of an animal for the purpose of providing stability, traction, and confidence to the animal while standing and moving across hard-surface flooring. Further, the present invention provides proprioceptive stimulus to an animal with certain neurological deficits resulting in long-term improvement in stance and gait while standing or moving across hard-surface flooring, including other hard surfaces that are slick and slippery.

The functionality of the various example embodiments will be explained in more detail in the following description, read in conjunction with the figures illustrating the invention. Turning now to the drawings, in which like numerals indicate like (but not necessarily identical) elements throughout the figures, example embodiments are described in detail.

Example Embodiments

Referring now to FIGS. 1-2, a nail grip 10 is shown, according to one embodiment of the present invention. The nail grip 10 is designed and configured to provide an animal with traction on slippery and/or hard surfaces, such as hardwood floors, tile, and the like. The traction means afforded by the nail grip 10 provides an animal with stability, mobility, and confidence, and greatly decreases the likelihood of injuries to an animal resulting from slipping and falling or collapsing on a slippery or hard surface.

In reference to FIG. 3, a partial isometric view of an animal's toe 3, toenail 4, digital pad 8, and nail bed 12 is illustrated. The partial animal toe configuration is more specifically shown as that of a domestic pet, particularly a canine. For purposes of understanding the nature and essence of the technical disclosure of the application, including the use thereof, the nail 4 includes an elongated, arcuate segment, the segment comprising a short proximal portion 5 extending from the nail bed 12, a long mid-portion 6, and a short distal portion 7.

Referring now more specifically to FIGS. 1, 2 and 4, the nail grip 10 comprises an annulus 18, more specifically defined as an elongated, tubular member 20, the tubular member 20 comprising an elongated body 21 having an open upper end 22, an open lower end 24, and a hollow interior 26 defined as a nail receiving cavity 27. The body 21 further comprises an external circumferential surface 28 and an inner circumferential surface 29, the inner circumferential surface 29 being a circular boundary defining the nail receiving cavity 27. The nail receiving cavity 27 defines a diameter measuring less than the smallest diametric measure of the external circumferential grip seating position of the nails 4 of an animal.

The open upper end 22 of the body 21 of tubular member 20 is in open, direct, fluid communication with the open lower end 24 thereof via the hollow interior 26. The upper end 22 includes a generally planar edge 23 and wherein the lower end 24 includes a generally planar edge 25.

The tubular member 20 is constructed of a flexible, returnably-resilient material having superior non-slip or gripping characteristics. Tubular member 20 may be substantially formed from any elastic material including, but not limited to, an elastomer. Non-limited examples of suitable elastic materials including natural latex rubber in addition to synthetic materials, such as styrene ethylene butadiene, styrene butadiene, polychloroprene (Neoprene), nitrile rubber, vinyl, and the like.

Alternatively, tubular member 20 may also be constructed of a polymer-based material, the polymer-based material defined as single-crystal silicon, however, other flexible plastic or polymeric materials suitable for constructing tubular member 20 include, but are not limited to, silicone rubber, thermosensitive siliconised polyvinyl chloride, polyurethane, polyethylene, polystyrene, and polyethylene terephthalate.

Still further, tubular member 20 may also be alternatively constructed of a material selected from the group comprising plastic, thermoplastic elastomers, or a metallic-plastic composite. Preferred plastic or thermoplastic elastomers include, but are not limited to, natural latex rubber, polyvinyl chloride (PVC), polypropylene, polyolefin, acrylonitrile-butadiene-styrene (ABS), polyethylene, polyurethane, polycarbonate, or blends thereof, and ABS/nylon blend. Tubular member 20 may be fabricated utilizing a common molding process such as injection molding, blow molding, extrusion, or other molding and fabricating methods.

Preferably, tubular member 20 is constructed of a flexible, returnably-resilient, non-toxic, water-impermeable elastomer.

Referring now to FIGS. 1, 2, 3, and 5, and more particularly to FIG. 4, the tubular member 20 is slid onto and annularly encompasses the nail 4 of the animal, the tubular member 20 being removably held to the nail 4 via mechanical interference. More specifically, tubular member 20 is slid onto the nail 4 and positioned so as to encompass the long mid-portion 6 thereof. Significantly, unlike the prior art, or any combination thereof, the tubular member 20 is sized and dimensioned for encompassing specifically the long mid-portion 6 of the nail 4 of an animal in a removably secured manner. More specifically, the tubular member 20 is slid onto the nail 4 so as to rest at the caudodistal edge of the nail tip 9 to create the grip zone 11. The dorsal aspect 13 of the tubular member 20 is positioned about the long mid-portion 6 of the nail 4.

In an alternative embodiment, a number of tubular members 20 may be removably secured to a corresponding number of selected nails 4, respectively.

During the initial placement or installation of the nail grip 10, the inner circumferential surface 29 of tubular member 20 may be lubricated to reduce friction during installation. For purposes of this disclosure, the term "lubricated" is intended to mean to make slippery or smooth, such as via water or other suitable lubricant. Said lubricants include, but are not limited to, water, isopropyl alcohol, water-based lubricant, glycerin, or compound with adhesive properties. Once installed, as the animal walks or runs, portions of tubular member 20 engage the walking/running surface, and grip such surface at grip zone 11 providing the animal with traction. The construction material of the nail grip 10 provides increased gripping and fraction for the animal on slippery and/or hard surfaces (e.g., hardwood floors, tile, and the like). The construction material of nail grip 10 is further configured with a degree of softness to provide a cushion between the animal's nails and contact with the hard-surface flooring.

In an alternative embodiment, a number of tubular members 20 may be secured or affixed to the nail of the animal via an adhesive including, but not limited to, pressure sensitive adhesives, glue, collagen-based adhesives, plant-based adhesives, synthetic monomer glues, such as cyanoacrylates, and synthetic polymer glues.

In accordance with one embodiment, either open end 22 or 24 of tubular member 20 may be slid onto the short distal portion 7 of nail 4 in a manner such that short distal portion 7 is slidably inserted into the nail receiving cavity 27, concurrently engaging intimately the inner circumferential surface 29 of tubular member 20, the inner circumferential surface 29 stretchably and/or flexibly conforming and adapting substantially to the outer surface configuration of the nail 4, and wherein tubular member 20 is further slidably engaged in a direction towards the base of the toe 3 until tubular member 20 is oriented in a removably secured position about the long mid-portion 6 of the nail 4. The tubular member 20 is positioned on the long mid-portion 6 of the nail 4 such that the short distal portion 7 of the nail 4 protrudes through the open end 22 or 24 of tubular member 20. Further, the edge 23 of the tubular member 20 sits at the caudodistal edge of the short distal portion 7 of the nail 4 and engages the hard-surface flooring via the grip zone 11 when the animal rises or moves across the slippery and/or hard-surface flooring.

In further accordance to the above-described embodiment of the present invention, the means by which tubular member 20 is removably affixed to the nail 4 is explained in further detail hereinbelow.

Tubular member 20 is removably secured about the long mid-portion 6 of the nail 4 via a displacement force of the inner circumferential surface 29 relative to the outer surface of the nail 4, with the inner circumferential surface 29 stretchably and/or flexibly resisting relative motion thereof and the outer surface of nail 4 by mechanical interference with one another, and by frictional engagement between the inner circumferential surface 29 and the outer surface of the nail 4. The dorsal aspect 13 of the tubular member 20 is positioned about the long mid-portion 6 of the nail 4. Further, the tubular member 20 rests at the caudodistal edge of the nail tip 9 to create the grip zone 11 that intimately engages the hard-surface flooring when the animal rises or moves across the slippery and/or hard-surface flooring.

The construction material defining tubular member 20 is important to the present invention. As previously described, the pliable properties defining the construction material of tubular member 20 provides each individual animal (having toenails) with a unique customized-fit nail grip. Thus, one embodiment of the present invention is adapted and configured to provide a universally-fitting animal nail grip 10. However, the present invention may also be constructed in various sizes to provide a more customized fit.

The following table provides examples of size and dimensions of the toenail grips of the present invention as used for canines:

| Size | Color | Interior Diameter | Wall | Outer Diameter |
|---|---|---|---|---|
| XS | Yellow | 0.063" (±.016") | 0.063" (±.008") | 0.189" (±.026") |
| S | Red | 0.094" (±.016") | 0.063" (±.008") | 0.220" (±.026") |
| M | Blue | 0.125" (±.016") | 0.063" (±.008") | 0.251" (±.026") |
| L | Green | 0.156" (±.016") | 0.070" (±.008") | 0.296" (±.026") |
| XL | Purple | 0.188" (±.016") | 0.078" (±.008") | 0.344" (±.032") |
| XXL | Orange | 0.188" (±.016") | 0.094" (±.008") | 0.376" (±.032") |

The sizes and dimensions of the toenail grips may be altered to fit other species of animals.

The animal nail grip 10 is envisioned to be commercially available in a variety of colors and/or patterns. In addition, the external circumferential surface 28 of the body 21 of tubular member 20 may be disposed with indicia and/or an ornamental pattern. Indicia and/or an ornamental pattern include alphanumeric text, images, logos, and symbols. Indicia and/or an ornamental pattern may further comprise decorative colorful images.

The present invention may be made commercially available as a kit, wherein the kit comprises a package, a plurality of nail grips 10, and an instruction leaflet providing detailed instructions for placing or installing the nail grips 10 on desired animal's nails 4. In an alternative embodiment, the kit comprises a package, a plurality of nail grips 10, an instruction leaflet providing detailed instructions for placing or installing the nail grips 10 on desired animal's nails 4, and a lubricant. In another alternative embodiment, the kit comprises a package, a plurality of nail grips 10, an instruction leaflet providing detailed instructions for placing or installing the nail grips 10 on desired animal's nails 4, a lubricant or an adhesive.

The toenail grips of the present invention provide an animal with improved gait and stance due to reduction in slippage on hard surfaces, including, but not limited to, hard-surface flooring. The toenail grip device improves the grip or fraction between the animal's foot and the contacting surface, spreads the shock of the foot contacting the hard-surface flooring, and provides confidence and stability to the animal as it moves across the hard-surface flooring.

Unexpectedly, the toenail grips of the present invention provide proprioceptive stimulus on the animal's toenails, thus drawing the attention of the animal's brain to the paws. Increased central nervous system input, coupled with improved stability, results in improved mobility and improved gait.

The following examples are provided to illustrate certain particular features and/or embodiments. These examples should not be construed to limit the invention to the particular features or embodiments described.

Example 1

A 13-year old female Shar-Pei mix has vision and balance deficits due to two recent vestibular episodes. The lack of balance and the loss of vision have resulted in fearfulness on the part of the dog. The fear not only affects the mobility of the dog, it translates to every part of her life, including how she relates to humans (timidity), how she relates to other dogs (aggression), and how she relates to food (panic episodes). The demeanor of the dog before using the toenail grips of the present invention is one of submission and fear. The ears of the dog are down, the head of the dog is down, and her stance is wide based. After proper placement of the toenail grips, the dog becomes confident by holding the head up, ears forward, and moves with confidence across the hard surface. Enhanced mobility resulting from the toenail grips provides the animal with confidence due to improved stability.

Example 2

A 15-year old altered male Scottish Terrier had trouble walking on any smooth surface and had lost the desire to take long walks. Upon application of the toenail grips of the present invention, the dog displayed an upright stance and confidence walking on hardwood floors. The dog, when wearing the toenail grips, no longer slips and is a much happier dog. As the muscle mass in the dog's legs returns due to increased movement, the dog is now taking walks again. The toenail grips of the present invention keep the dog mobile.

Example 3

A 14-year old altered female Labrador mix had trouble with basic mobility during a stay at a home with wooden stairs. The stairs had to be traversed multiple times a day and slippage occurred regularly. After returning to the dog's home, the dog began to hesitate moving across the tile floors, having recalled the experience of slipping over the wood floors. The owner placed rugs down on the tile floors to assist the dog in moving across the floor, and provided rehabilitation and therapy to the dog. Upon placement of the toenail grips of the present invention, the dog experienced immediate improvement in stability, confidence and walking. The movement of the dog continued to improve over the following month. The rugs were removed from the tile floors and the dog no longer hesitates to walk over the tile floors.

Example 4

A front-limb amputated 9-year old altered female Labrador Retriever had difficulty moving across wood floors. The amputee could not get up from the floor without her three legs coming out from under her frame. The dog would fall down every time she tried to get up from the hardwood floors. Walking across hardwood floors was a labored process for the amputee to maintain balance with only three legs. Immediately after placement of the toenail grips of the present invention, the amputee dog can get up with ease and confidence and walk/run across the hardwood floors without falling or slipping.

Example 5

A male Golden Retriever had difficulty getting up from a hardwood floor. Upon placement of the toenail grips of the present invention, immediate results were observed. The dog was stable on the hardwood floors, and was capable of starting and stopping quickly, and jumping without slipping and falling.

Example 6

A 15-year old female dog with end stage degenerative joint disease in her hips had difficulty standing and moving across a tile floor. After applying the toenail grips of the present invention, the dog was able to immediately stand with little difficulty or slippage. Each day the dog wears the toenail grips, the more confidence is displayed while moving across hard surfaces.

Example 7

A 14-year old male Labrador Retriever had trouble getting up from hardwood floors due to advanced arthritis. Immediately upon placement of the toenail grips of the present invention, the dog can get up and move across the hardwood floor without slipping and the added cushion masks the sound of the nails striking the hardwood floors.

Example 8

A 10-year old male Labrador Retriever having had a hind leg amputated due to cancer, has difficulty maintaining balance on hard-packed snow and ice. Immediately after placement of the toenail grips of the present invention on the dog's toenails of the rear foot, the dog is able to maintain an upright position while walking over hard-packed snow and ice. When walking over pure ice, the dog's hind foot would start to slide and then the toenail grips would grip the ice and keep the dog upright.

The toenail grips of the present invention help to improve biomechanical function, posture, and gait of an animal by reducing abnormal forces on joints caused by compensation and lameness. When an animal is injured, the animal will favor the injured limb or limbs by placing more weight on its uninjured limbs, thereby creating abnormal or excessive force to the joints of the uninjured limbs. Favoring the injured limb or limbs results in altered posture and gait of the animal. Resultant abnormal biomechanical forces cause abnormal stress on the joints of the uninjured limb or limbs. The toenail grips of the present invention help prevent the animal from slipping and sliding, thereby reducing the chance of slip-and-fall accidents. The traction means afforded by the nail grips provide stability, mobility, and confidence to the animal, thereby improving the biomechanical function, posture and gait of an animal.

In another embodiment of the present invention, it is envisioned that the toenail grips will be used as a therapeutic tool to aid in the rehabilitation of animals having surgery, especially orthopedic. The toenail grips may be used post-operatively for animals recovering from orthopedic procedures, such as knee and hip surgeries, and/or soft tissue surgery, by providing improved stability to the animal and decreasing the chance for slip-and-fall injuries. Further, the toenail grips will assist the animals in rising from any surface while they are in a weakened or disabled condition. The toenail grips of the present invention provide the necessary traction and gripping needed for the animals to rise, stand and move across hard-surface flooring, thereby permitting the animals to recover faster during their post-operative rehabilitation period. The muscle tone of the rehabilitating animal may be enhanced due to the animal's ability to rise and move about during their rehabilitation.

The toenail grips of the present invention were developed by a veterinarian who saw the need to provide traction and grip to animals rising on and moving across hard-surface flooring, as well as other types of hard surfaces that are slick and slippery. The toenail grips of the present invention fulfill this need to provide traction and grip to animals due to the lack of any other product on the market to address fraction through the toenails. This need is especially felt where there was, prior to the present invention, no practical solution available to senior animals with impaired stability and movement.

The various embodiments, as separately disclosed, are interchangeable in various aspects, so that elements of one embodiment may be incorporated into one or more of the other embodiments, and that specific positioning of individual elements may necessitate other arrangements not specifically disclosed to accommodate performance requirements or spatial considerations.

It is to be understood that the embodiments and claims are not limited in their application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and/or being practiced and carried out in various ways. Also, it is to be understood that the phraseology and terminology employed herein are for the purposes of description and should not be regarded as limiting the claims.

The purpose of the abstract provided herein is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The abstract is neither intended to define the claims of the application, nor is it intended to be limiting to the scope of the claims in any way. It is intended that the application be defined by the claims appended hereto.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A method for reducing slippage of an animal on a hard surface, comprising attaching one or more annuluses to one or more toenails of the animal, wherein the one or more annuluses each comprises an elongated, tubular member having an upper end, a lower end, and a hollow interior, the attaching step being practiced by positioning the tubular member such that an edge of the tubular member lower end sits at a caudodistal edge of the animal toenail and such that a distal portion of the animal toenail protrudes through the lower end.

2. The method of claim 1, further comprising removing the tubular member when the tubular member is to be replaced or changed.

3. The method of claim 1, wherein the attaching step is practiced by attaching a dorsal aspect of the tubular member along an upper midportion of the animal toenail.

4. The method of claim 1, wherein the step of positioning the tubular member comprises forming a grip zone defined by a portion of the tubular member that is positioned to engage the hard surface.

5. The method of claim 4, further comprising providing increased traction of the animal toenail with the hard surface when the grip zone is in contact with the hard surface.

6. A method for improving traction of an animal on a hard surface, comprising attaching one or more annuluses to one or more toenails of the animal, wherein the one or more annuluses each comprises an elongated, tubular member having an upper end, a lower end, and a hollow interior, wherein the animal toenails include a top surface and a bottom surface, and wherein the attaching step is practiced such that the one or more annuluses engage both of the top and bottom surface of the animal toenail and such that a distal portion of the animal toenail protrudes through the lower end and is exposed.

7. The method of claim 6, wherein the attaching step is practiced by positioning the tubular member such that an edge of the tubular member sits at a caudodistal edge of the animal toenail to form a grip zone.

* * * * *